United States Patent [19]

Reese et al.

[11] Patent Number: 4,983,200
[45] Date of Patent: Jan. 8, 1991

[54] GLASS SHAPING RING HAVING A THERMAL INSULATING MEMBER AND METHOD OF SHAPING GLASS SHEETS USING SAME

[75] Inventors: Thomas J. Reese, Sarver; David B. Rayburn, Vandergrift, both of Pa.

[73] Assignee: PPG Industries, Inc., Pittsburgh, Pa.

[21] Appl. No.: 406,476

[22] Filed: Sep. 13, 1989

[51] Int. Cl.$^5$ .......................................... C03B 23/027
[52] U.S. Cl. ...................................... 65/103; 65/104; 65/107; 65/288; 65/291
[58] Field of Search .................. 65/103, 104, 107, 273, 65/287-291

[56] References Cited

U.S. PATENT DOCUMENTS

| | | | |
|---|---|---|---|
| 3,264,082 | 8/1966 | Golightly | 65/103 |
| 3,265,488 | 8/1966 | Ross et al. | 65/103 |
| 3,278,287 | 10/1966 | Leflet et al. | 65/103 |
| 3,976,462 | 8/1976 | Sutara | 65/288 |
| 4,375,978 | 3/1983 | Reese et al. | 65/287 |
| 4,687,501 | 8/1987 | Reese | 65/103 |

*Primary Examiner*—Joye L. Woodard
*Attorney, Agent, or Firm*—Andrew C. Siminerio; Donald C. Lepiane

[57] ABSTRACT

A method of reducing localized tensile stresses in shaped glass sheets formed by sag bending. An unperforated thermal insulating member is mounted throughout the area within a shaping rail and spaced below a heat softened glass sheet shaped on the shaping rail to thermally insulate the glass from heat reradiated from the shaping rail and reduce air circulation beneath the sheet so as to support structure during the cooling of the shaped glass sheet and provide more uniform cooling of the entire glass sheet.

5 Claims, 2 Drawing Sheets

GLASS SHAPING RING HAVING A THERMAL INSULATING MEMBER AND METHOD OF SHAPING GLASS SHEETS USING SAME

BACKGROUND OF THE INVENTION

1. Field of the Invention

This invention relates to shaping glass sheets and in particular to reducing the residual stresses in glass sheets formed on shaping rails by sag bending.

2a. Technical Considerations

Bent glass sheets are commonly used as glazing closures in vehicles such as automobiles and the like. For such applications, the glass sheets must be bent to precisely defined curvatures dictated by the configuration and outline of the openings in the vehicles in which the bent sheets are to be installed as well as the overall vehicle styling. At the same time it is important that the bent sheets meet stringent optical and strength requirements.

It is common practice to shape a glass sheet on a bending mold having contoured shaping rails that support an initially flat glass sheet and convey it through a heating lehr. As the temperature of the supported glass approaches its heat softening temperature, it begins to sag under the force of gravity and conform to the contours of the shaping rails on the mold. If required, the bending mold may include hinged end sections to help facilitate bending portions of the glass sheet to sharp curvatures that could not normally be obtained through normal sag bending techniques. Where windshield glass is being shaped, two overlaying glass sheets, or doublets, may be conveyed through the lehr on the bending mold and shaped simultaneously.

After shaping, the glass sheet is cooled. When the glass is to be annealed, i.e. cooled slowly through its annealing range, as would be the case if the glass is to be used to fabricate a laminated windshield, it is common practice to cool the glass while it remains on the bending mold. It has been found that selected components of the bending mold, and in particular the mold shaping rails, support framing, ballast and/or heat shields function as heat sinks during the heating and sag bending operation and reradiate absorbed heat during the cooling operation. As a result, portions of the glass closer to these components of the mold cool more slowly than the surrounding portions of the glass. The non-uniform cooling produces localized high tensile stresses in those portions of the glass that cool at a slower rate which in turn makes these highly stressed areas more susceptible to breakage from impact. This effect is particularly noticeable about the perimeter of the glass where peripheral portions of the glass are in direct contact with the shaping rail.

It would be advantageous to be able to reduce the localized high stresses resulting from the non-uniform cooling to the glass.

2b. Patents of Interest

U.S. Pat. Nos. 3,264,082 to Golightly and 4,687,501 to Reese disclose the use of ballast and lightweight bending iron shields for glass sheet bending molds.

U. S. Pat. Nos. 3,976,462 to Sitara and 4,375,978 to Reese et al. disclose bending iron molds used in sag bending operations. Each includes contoured shaping rails supported by posts on a main support frame that is conveyed through a heating lehr. Flat glass sheets are positioned on the shaping rail of the bending mold and sag into contact with the rails as the glass sheets are heated in the lehr.

SUMMARY OF THE INVENTION

The present invention provides a method of reducing localized tensile stresses in glass sheets formed by sag bending on an outline bending mold. The mold includes a main support frame and a shaping rail positioned slightly inboard of the glass sheet's perimeter. The glass sheet is positioned on the shaping rail, which has a supporting surface elevation and outline corresponding to the desired shape of the glass sheet, and heated to its heat softening temperature so that it sags under the force of gravity and conforms to the contours of the shaping rail. After shaping, the glass is cooled. Selected components of the mold absorb heat during the sag bending operation and reradiate the heat during the cooling operation, resulting in non-uniform cooling of the glass and localized high tensile stresses in those areas of the glass that cool at a slower rate than the surrounding glass. The present invention reduces these localized stresses by positioning an insulating member between the shaped glass sheet and the selected components of the mold that reradiate heat during the cooling operation. In one embodiment of the invention, a heat insulating blanket is positioned below and spaced from the shaped glass sheet, extending throughout the area defined by the shaping rail. The insulating blanket thermally insulates the shaped glass sheet from the selected mold components and reduces variations in the cooling rate of the glass which would otherwise result due to portions of the glass being closer to the selected mold components than other portions of the glass.

DETAILED DESCRIPTION OF THE INVENTION

Although the present invention is shown in use with shaping glass sheets, it is understood that it may be used to control the cooling of other materials where non-uniform cooling adversely affects the strength of the material.

Figure 1:
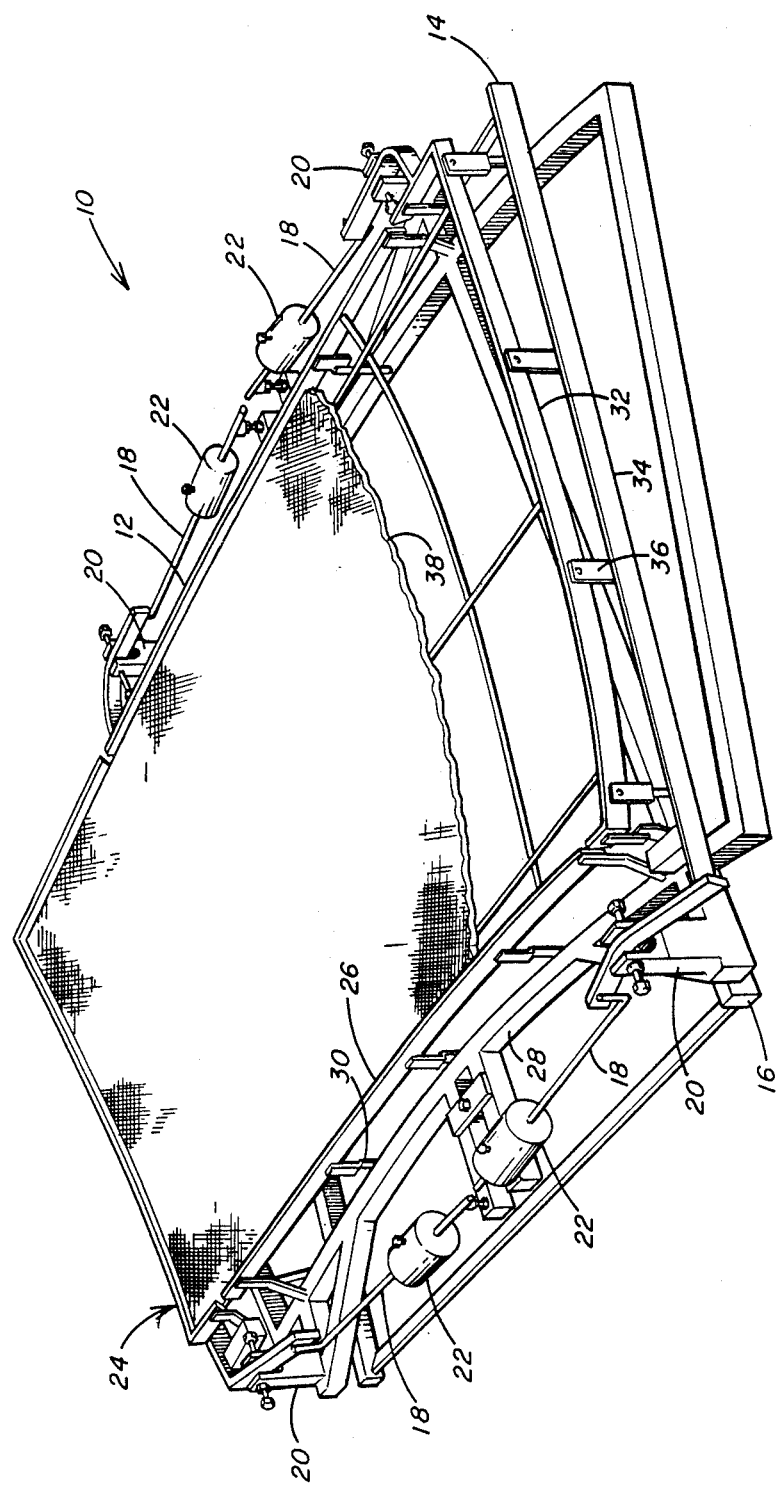
FIG. 1 is an isometric view of a bending mold incorporating portions of the present invention, with portions removed for clarity.

Referring to FIG. 1, glass bending mold 10 is an articulating mold similar to that disclosed in U. S. Pat. No. 3,976,462 to Sitara, but nonarticulating molds similar to U. S. Pat. No. 4,375,978 to Reese et. al. may also be used in the present invention. Although not limiting in the present invention, the mold 10 comprises a central mold portion 12 flanked by two pivoting mold end sections 14. The mold 10 is supported for movement through a heating lehr (not shown) by a main frame 16. Weight arms 18 are attached to each mold end section 14 and are mounted on frame 16 by hinge posts 20. Arms 18 are provided with counterweights 22 at their longitudinal inward extremities which tend to rotate the mold end sections 14 about hinge posts 20 from an open position (not shown) to a closed position as depicted in FIG. 1. Weight arms 18 are positioned laterally outside shaping rails 24 of the bending mold 10.

Shaping rails 24 of the mold 10 include central shaping rails 26 supported from rigid reinforcing bars 28 by members 30 in the central portion 12 and end shaping rails 32 supported from reinforcing bars 34 by members 36 in each mold end section 14. Reinforcing bars 28 in the central mold section 12 are rigidly attached to frame 16 while reinforcing bars 34 in each end mold section 14 are pivotally mounted on frame 16 through hinge post 20. When the mold sections 14 are in their upright and closed position as shown in FIG. 1, the elevational contour of the shaping rail 24 defines the final desired contour of the shaped glass sheet slightly inboard of the glass sheet perimeter.

Figure 2:
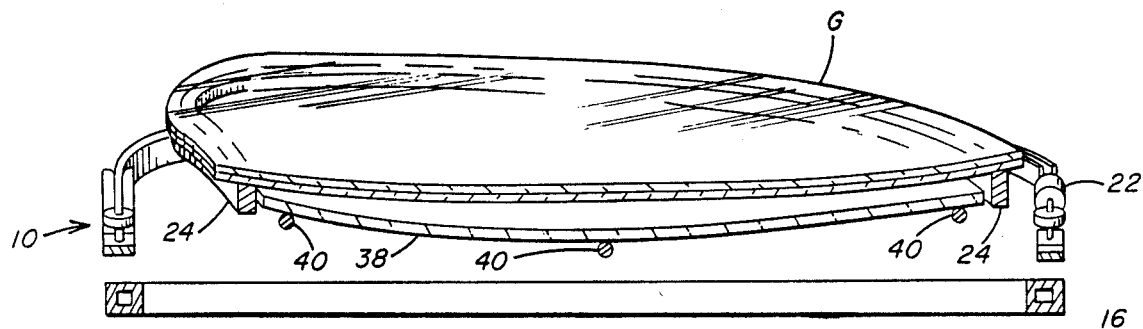
FIG. 2 is a cross-section of the bending mold shown in FIG. 1, with portions removed for clarity.

As discussed earlier, non-uniform cooling of the shaped glass sheet G while supported on the shaping rails 24 of mold 10 results in localized high tensile stresses in those areas of the glass that cool at a rate slower than that of the surrounding glass. To reduce this stress, a thermally insulating member 38 is positioned between the glass sheet G and the heat retaining components of the mold 10, as shown in FIGS. 1 and 2. Although not limiting in the present invention, the member 38 is preferably positioned below and spaced from the glass sheet G and extends throughout the area defined by the shaping rails 24. The member 38 "evens out" the cooling rate of the glass sheet G by insulating the glass sheet G from the reradiated heat and reducing air circulation beneath the glass sheet G so as to keep the entire sheet at a more uniform temperature as it is cooled after shaping. Any gaps in the rail 24 or spaces in the member 38 should be filled with the insulating member 38 or other insulating material to prevent air flow under the glass sheet G that would adversely affect the uniform glass cooling rate. Although not limiting in the present invention, in one particular embodiment of the invention, the member 38 is a ½ inch (1.27 cm) thick insulating blanket available from Babcock and Wilcox under the tradename KAOWOOL ZR. The blanket is positioned approximately 2 inches (5.08 cm) below the glass sheet G and supported in any convenient manner known in the art, e.g. a wire framework 40 as shown in FIGS. 1 and 2, or expanded metal (not shown).

Figure 3:
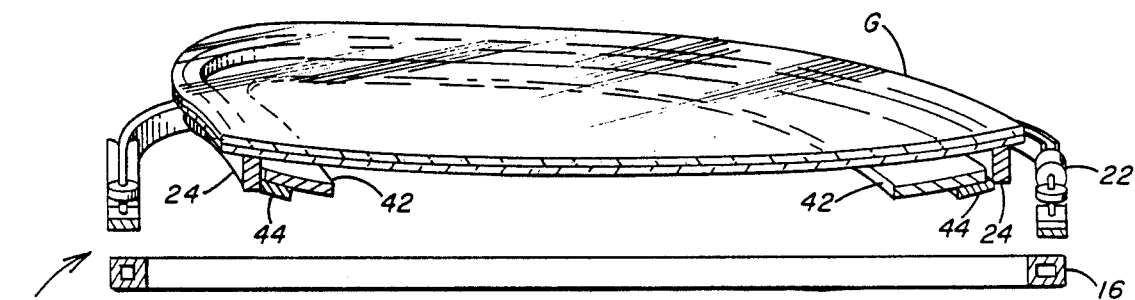
FIGS. 3 and 4 are cross-sections similar to FIG. 2 of alternate embodiments of the invention.

FIG. 3 illustrates an alternate embodiment of the present invention which is particularly suited for a mold configuration whose major source of reradiated heat which results in localized high tensile stresses in the shaped glass G is the mold shaping rails. Insulating members 42 extend inwardly from the shaping rails 24 below the glass sheet G toward the central portion of the mold 10 to provide a more uniform cooling rate transition between those portions of the glass sheet G directly supported by the rail 24 and those glass portions spaced from the rail 24. As a result, there is less non-uniformity of the glass sheet G cooling rate about its periphery and lower localized tensile stresses. Although not limiting in the present invention, in the particular embodiment illustrated in FIG. 3, the members 42 are supported on a plate 44 secured to the shaping rail 24 and extend inwardly approximately 6 inches (15.24 cm).

Figure 4:
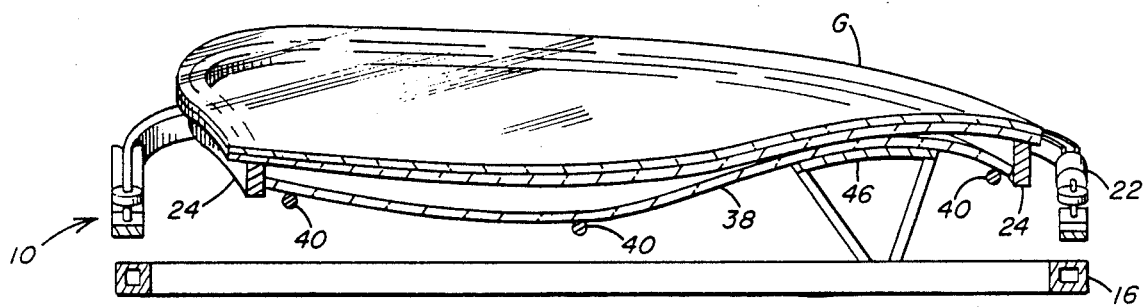

The present invention may also be used in combination with mold configurations having auxiliary shaping arrangements. Although not limiting in the present invention, referring to FIG. 4, insulating member 38 is draped over a partial shaping surface 46 positioned within the area defined by the shaping rails 24. It is contemplated that the present invention can also be used in combination with ballast (not shown) and heat shields (not shown), which are commonly used in forming glass sheets by sag bending as disclosed in U. S. Pat. Nos. 3,264,082 to Golightly and 4,687,501 to Reese, which teachings are hereby incorporated by reference.

The forms of the invention shown and described in this disclosure represents illustrative preferred embodiments thereof. It is understood that various changes may be made without departing from the spirit of the invention defined by the claimed subject matter that follows.

We claim:

1. In a method of shaping heat softenable sheet by sag bending, wherein the method includes the steps of positioning a sheet to be shaped on a shaping rail of a sag bending mold, the shaping rail defining an area, heating the sheet to its deformation temperature to sag the sheet on the shaping rail to shape the sheet, and cooling the shaped sheet while supported on the shaping rail, wherein during the cooling of the sheet the mold radiates heat and air circulates beneath the shaped sheet resulting in non-uniform cooling of the sheet which results in localized high tensile stresses in portions of the sheet, the improvement comprising:
   providing a thermal insulating member below the sheet and substantially throughout the area defined by the shaping rail to even out the cooling rate of the sheet by insulating the sheet from the radiated heat and circulating air to reduce tensile stresses in the sheet.

2. The method as in claim 1 wherein the sheet is a glass sheet.

3. In a shaping outline mold of the type having a support, a sheet shaping rail, means for mounting the sheet shaping rail on the support to define (1) an elevated sheet supporting surface and (2) an area within the sheet supporting surface, wherein the improvement comprises:
   a thermal insulating member capable of substantially preventing gas flow therethrough; and
   means for mounting said thermal insulating member below the sheet supporting surface and substantially throughout the area within the sheet shaping rail.

4. The mold as in claim 3 wherein the shaping rail includes at least one movable end rail section and a central mold rail section and the means for mounting the sheet shaping rail includes means for pivotally mounting the at least one movable rail section to the central mold rail section.

5. The mold as in claim 3 wherein said thermal insulating member is an unperforated insulating blanket.

* * * * *